(No Model.)
J. A. BARRETT.
GALVANIC BATTERY.
No. 405,196. Patented June 11, 1889.
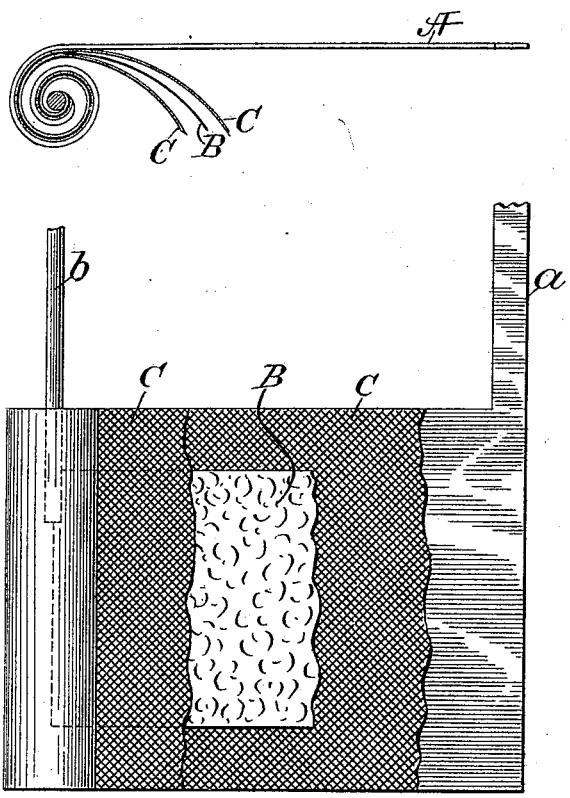
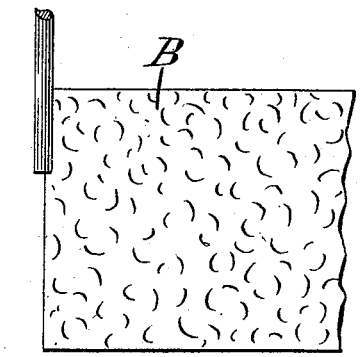
WITNESSES:
J. H. Murdly
S. Field.
John A. Barrett,
INVENTOR
BY
McTighe & Worthington
ATTORNEYS.

UNITED STATES PATENT OFFICE.

JOHN A. BARRETT, OF BROOKLYN, NEW YORK, ASSIGNOR TO THE JOHN A. BARRETT BATTERY COMPANY, OF BALTIMORE, MARYLAND.

GALVANIC BATTERY.

SPECIFICATION forming part of Letters Patent No. 405,196, dated June 11, 1889.

Application filed April 5, 1889. Serial No. 306,109. (No model.)

*To all whom it may concern:*

Be it known that I, JOHN A. BARRETT, a citizen of the United States, residing at Brooklyn, in the county of Kings and State of New York, have invented certain new and useful Improvements in Galvanic Batteries; and I do hereby declare the following to be a full, clear, and exact description of the invention, such as will enable others skilled in the art to which it appertains to make and use the same.

My invention relates to certain improvements in galvanic batteries, the objects of which improvements are, among other things, to simplify the construction and increase the life of the battery and its efficiency.

My invention, so far as concerns the solution claimed, has special reference to chloride-of-silver batteries; and its object is to avoid the undue wasting of the silver element of plate and the undue formation of troublesome double salts or foreign and insoluble compounds that tend to clog the action of the battery.

The object of the invention is, further, to avoid the deposition of silver upon the zinc or positive plate of the battery.

A further object of my invention is to provide a silver plate or element in which the chloride of silver shall be better applied to give a more economical and efficient action.

The object of my invention is also to apply or combine the active salt or battery material with the battery elements or plates in a convenient manner and in such way that the battery may be rendered active by simply dipping the battery elements into water, and that the operative part of the battery may be put up in compact form, and may be readily transported before use without liability to loss or displacement of the charging material.

In chloride-of-silver batteries of the ordinary kind the practice is to employ a solution of sal-ammoniac, chloride of sodium, chloride of zinc, &c., as the liquids in which the zinc and silver elements of the battery are immersed. The objection to solutions of these and of other kinds heretofore employed in batteries of this kind is, that the chloride of silver is soluble in them unless the solution is made very weak, and the silver is liable to deposit on the zinc element, while if the solution is made weak the current is cut down, owing to the increased internal resistance. These solutions are also objectionable, in that they produce insoluble compounds that interfere with the free action of the battery.

My invention consists in the employment for a chloride-of-silver battery of a solution of sulphate of zinc, and in the construction and arrangement of the elements, as hereinafter fully described and claimed.

I employ sulphate of zinc in solution, as I find that with this solution the formation of the troublesome double salts is avoided and the dissolution of the chloride of silver is prevented. I find, also, that although in my improved solution the chloride of silver will not dissolve to any troublesome extent, yet the battery is strong and constant, as well as free from the objections before mentioned.

In the ordinary forms of chloride-of-silver battery the chloride of silver is attached to the silver plate or element in a solid mass, the chloride being for this purpose fused about the silver element in a mold. This manner of applying the chloride of silver is wasteful, and the solid mass of chloride interferes with the free action of the battery. I apply the chloride in a thin layer or film over the surface of the silver, and to aid in the application of the chloride in this way I prefer to employ as the silver element a thin sheet of silver, upon which the chloride of silver is spread, and is then fused by simply passing the sheet of metal over a flame. If applied in small enough quantity, the effect is to cause the fused chloride to adhere to the plate in small blotches or spots thickly disposed over the silver surface and leaving the silver exposed in places. A silver plate or element thus prepared I find to be very efficient, while requiring a minimum amount of chloride in order to produce the desired effect in the battery.

The silver plate I make so thin that it may readily be rolled into a spiral, as will be presently described.

I prefer to charge the battery with the sulphate in a dry form, and for this purpose I impregnate the porous diaphragm between the zinc and silver elements with the salt by boiling or saturating the diaphragm with a saturated solution of the salt, after which the liquid is evaporated, leaving the salt in a dry or inactive state. The porous diaphragm may then be in contact with both elements without producing action, while the addition of water will at any time put the battery into an active condition.

The porous diaphragm I prefer to make of a textile fabric—such as cotton cloth—and to interpose the same between and in contact with the zinc and silver elements. If the latter (the elements) be made so thin as to be flexible, they may be rolled into a solid spiral with layers of the impregnated fabric.

In the accompanying drawings I have shown the parts of a chloride-of-silver battery made in accordance with my invention.

Figure 1 is an edge view of the zinc and silver elements and their interposed textile diaphragm partially unrolled from the spiral or volute into which they are formed. Fig. 2 is a side view of the same parts. Fig. 3 is a side view of a portion of the silver element.

A indicates a sheet of zinc sufficiently thin and flexible to be readily rolled up with the thin sheet of silver forming the silver element B. The zinc is provided with an elongated connecting-piece $a$, to which electrical connection may be made, and the silver element has soldered to it a silver wire $b$ for a similar purpose. The sheet-silver is supposed to be coated with its film of chloride of silver. Two pieces of cotton cloth C C form the porous diaphragm which separates the zinc and silver plate when rolled up into a close spiral. The pieces C C are preferably of sufficient length and width to overlap the edges of the silver plate or element.

The sheets of silver, zinc, and impregnated cloth are rolled together into close convolutions to form a compact mass, readily transportable, and capable of being put into action at any time by simply dipping into water.

What I claim as my invention is—

1. In a chloride-of-silver battery, substantially such as described, a solution of sulphate of zinc.

2. The electric battery comprising a containing-vessel, electrodes, respectively, of chloride of silver and metallic zinc, and a solution of zinc sulphate.

3. In a chloride-of-silver battery, zinc and silver elements formed in thin sheets rolled in a close spiral with interposed sheets of textile fabric impregnated with sulphate of zinc in a dry state.

In testimony whereof I affix my signature in presence of two witnesses.

JOHN A. BARRETT.

Witnesses:
GEO. L. BETTS, Jr.,
GEORGE E. COMYNS.